Figure 1:
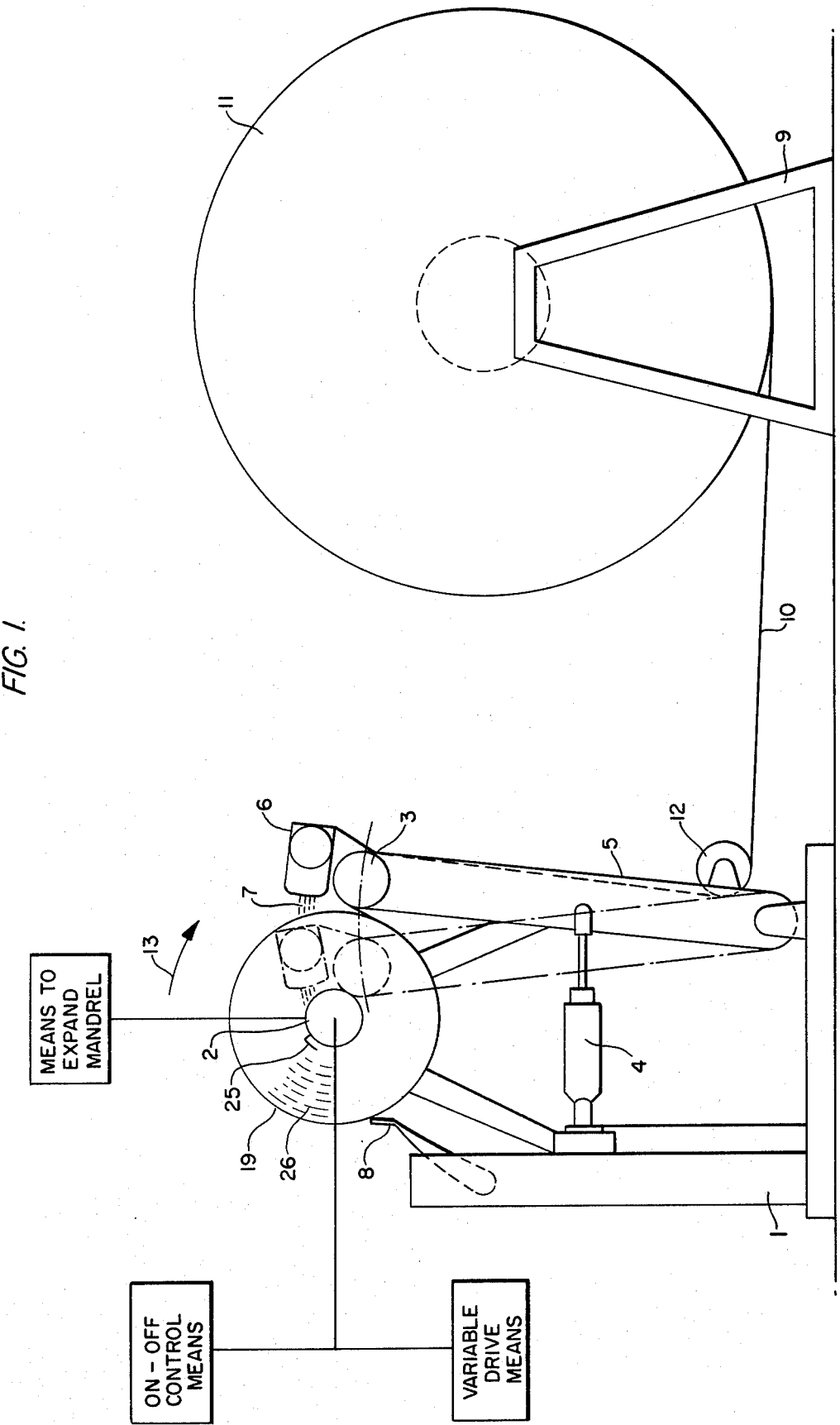

United States Patent [19]

Fortsch et al.

[11] 4,380,486
[45] Apr. 19, 1983

[54] MACHINE INSTALLATION FOR THE PRODUCTION OF THICK-WALLED INSULATING PIPES OF FOAM SYNTHETIC RESIN SHEETS

[75] Inventors: Johann Fortsch, Goldbach; Cosmas Lorry, Niederkassel; Gustav Schweiger, Kleinostheim, all of Fed. Rep. of Germany

[73] Assignee: Dynamit Nobel Aktiengesellschaft, Troisdorf, Fed. Rep. of Germany

[21] Appl. No.: 229,756

[22] Filed: Jan. 29, 1981

[30] Foreign Application Priority Data

Feb. 1, 1980 [DE] Fed. Rep. of Germany ... 8002596[U]

[51] Int. Cl.³ ............................................ B32B 31/22
[52] U.S. Cl. ..................................... 156/359; 156/64; 156/82; 156/363; 156/378; 156/446; 156/459; 156/497; 156/510
[58] Field of Search ................. 156/82, 184, 187, 193, 156/267, 359, 361, 363, 459, 497, 510, 580, , 378, 446, 64

[56] References Cited

U.S. PATENT DOCUMENTS

| | | | |
|---|---|---|---|
| 2,503,041 | 4/1950 | Greene | 156/184 |
| 3,239,399 | 3/1966 | King | 156/497 X |
| 3,553,046 | 1/1971 | Crawford et al. | 156/184 |
| 3,582,430 | 6/1971 | Benigno | 156/82 X |
| 4,149,928 | 4/1979 | Graham | 156/184 |

*Primary Examiner*—Caleb Weston
*Attorney, Agent, or Firm*—Antonelli, Terry & Wands

[57] ABSTRACT

A machine installation for the manufacture of a thick-walled insulating pipe of elastic, laminatable foamed synthetic resin sheet material, includes an apparatus for effecting the lamination of a foamed synthetic resin sheet material to form a multilayer insulating pipe having a length corresponding to the sheet width of the sheet of foam material and a finishing unit. The laminating apparatus has an expandable and rotatable mandrel equipped with a pneumatic expanding means and an infinitely variable drive mechanisms for rotating the mandrel to wrap the sheet material thereon, and a pressure roller which can be urged against the mandrel. The roller is movable pneumatically by a telescopic holder, and the mandrel is associated with a pivotably mounted burner and a cutter. The unit for finishing the initially formed pipe product has a shaft rotatable in timed segments with clamping jaws attached to holding arms that are spaced from the shaft; the jaws being capable of receiving an unfinished insulating pipe product and being opened and closed pneumatically. One holding arm is associated with a band cutter for trimming the end faces of the insulating pipe product, and another holding arm is associated with a blade for slitting the insulating pipe along its length.

8 Claims, 2 Drawing Figures

MACHINE INSTALLATION FOR THE PRODUCTION OF THICK-WALLED INSULATING PIPES OF FOAM SYNTHETIC RESIN SHEETS

The invention relates to a machine installation or arrangement for the production of thick-walled insulating pipes formed of elastic, laminatable foamed synthetic resin sheets as well as a process for forming such pipes.

Insulating sheaths or insulating pipes made of foam material are utilized, in particular, for insulating against cold or heat, for example, in an entire sanitary installation, such as hot water, cold water, sewage, heating conduits, etc. Insulating pipes can be directly extruded, but it is also possible to make such insulating pipes from prefabricated lengths of foam material; such methods are described, for example, in DOS [German Unexamined Laid-Open Application] 1,915,768 and DOS No. 2,532,406. The conventional processes, however, prove to be very expensive for the manufacture of insulating pipes having a large wall thickness and large internal diameters of such insulating pipes, as they are used, for example, for insulating pipelines, long-distance heating pipes, floating pipelines, etc.

The invention is based on the object of providing an apparatus for producing thick-walled insulating pipes of foamed synthetic resin sheets in a simple and economical fashion with the insulating pipes having differing internal diameters and varying wall thicknesses, depending on the purpose for which the pipes are employed.

According to the invention, the above-posed object has been attained by an arrangement or installation having an apparatus for lamination of a foamed synthetic resin sheet to form multilayer insulating pipes having a length corresponding to the sheet width of the sheet of foam material, the apparatus comprising an expandable and rotatable mandrel equipped with a pneumatic tensioning means and an infinitely variable drive mechanism, and a pressure roll which can be urged against the mandrel, the roller being movable pneumatically by a telescopic holder, and the mandrel being operatively associated with a pivotably mounted burner and a cutter. The arrangement also includes a finishing unit having a shaft rotatable in timed segments with clamping jaws attached to holding arms at a spacing from the shaft, the jaws being capable of receiving the unfinished insulating pipe and of being opened and closed pneumatically, wherein one holding arm is associated with a band cutter for trimming the end faces of the insulating pipe and a second holding arm is associated with a blade for slitting the insulating pipe. The apparatus of this invention can be used with special advantage for the manufacture of insulating pipes having internal diameters of 200–1,200 mm or thereabove and with wall thicknesses of 30 mm to 500 mm or more. By the use of an expandable mandrel, the apparatus can be used with variability for the production of the aforementioned insulating pipe diameters. The wall thickness of the insulating pipes is obtained by the fact that the foam sheet is arranged in multiple layers, wherein the individual layers are laminated to one another preferably by a heat treatment by flame or hot air. However, it is also possible to effect laminations with bilaterally adhesive strips between the individual plies of the sheet or to laminate on the outside onto the insulating pipes of foam material additionally a film of a synthetic resin, for example, or a metallic foil. Another proposal made in accordance with this invention is likewise directed toward this end, namely to provide means for attaching the expandable mandrel to a machine frame so that the mandrel is exchangeable.

The invention can be performed especially advantageously, for example, with foam sheets of crosslinked polyethylene foam material which can be readily flame-laminated. In a further development of the invention it is suggested, therefore, to use a water-cooled propane gas-air mixture burner. Advantageously, a regulating means for the ignition of the burner in dependence on the revolution of the expandable mandrel is correlated with the burner so that after a new foam sheet has been applied to the expanding mandrel for producing an insulating pipe, the laminating step for producing a multilayer insulating pipe can take place automatically. The proposal of this invention, to provide a control device, for example a perforated disk, for measuring the number of revolutions of the expanding mandrel and/or for measuring the number of plies of foam sheet for the insulating pipe to be manufactured, also is directed along these lines.

The insulating pipe, i.e. the initially formed product, produced by lamination of the foam sheet then requires a cutting to size to the correct dimensions in order to obtain the final product, i.e. the end faces must be trimmed and a slit must be provided so that the insulating pipe can later on be attached for insulating purposes to the appropriate pipeline, long-distance heating pipe, etc. The invention proposes to effect such measures by providing four holding arms on the shaft equipped with holding arms, at a mutual angle of 90°, these arms corresponding to four working steps to be executed in succession on the insulating pipe and thus making it possible to execute a timed operating process in a simple way. To produce the slit in the insulating pipe, a revolving, high-speed circular blade is advantageously arranged which is moved in parallel to the longitudinal axis of the insulating pipe and effects a slitting operation during each run along the pipe.

Figure 2:
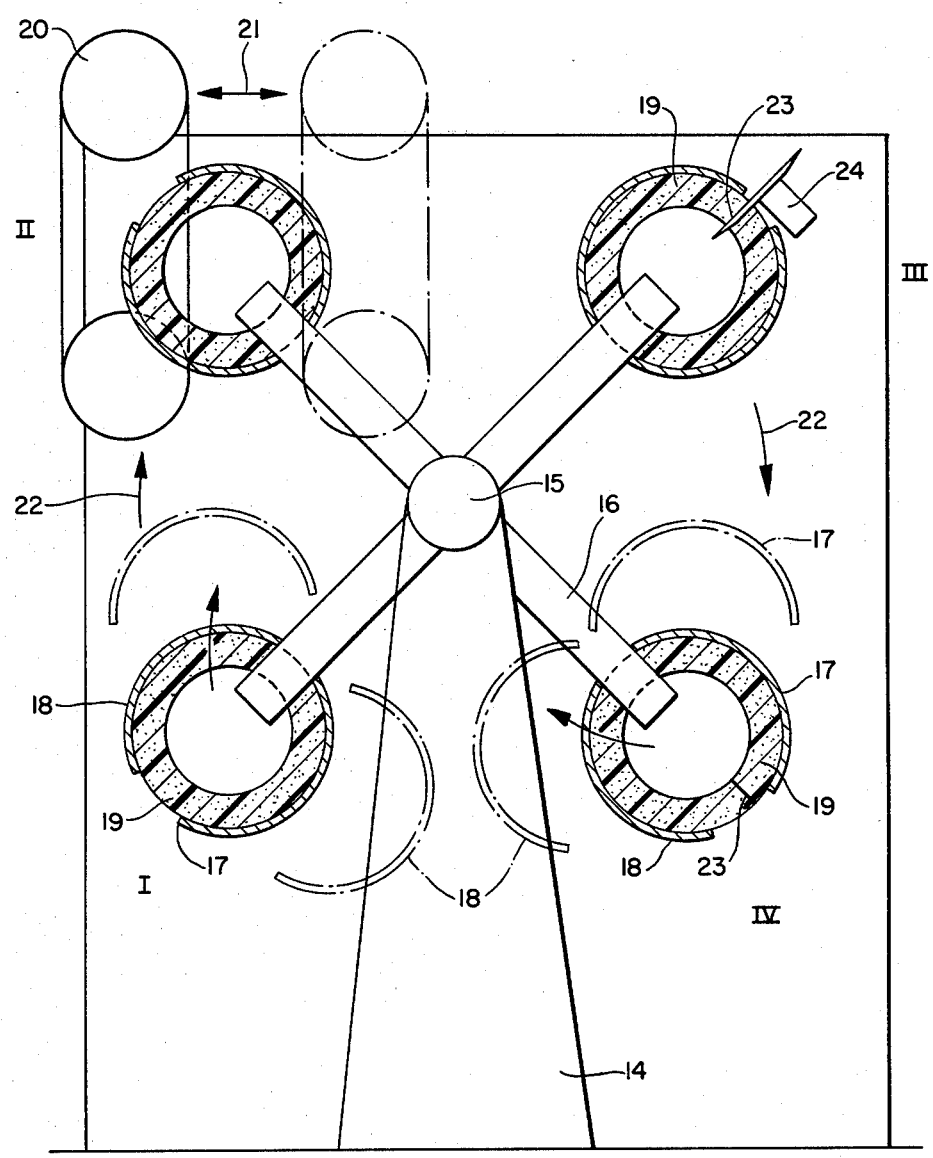

One embodiment of the apparatus of the invention will be explained in greater detail with reference to the accompanying drawing wherein:

FIG. 1 shows a schematic view of the laminating apparatus for producing the multilayer (multiple-ply) insulating pipe; and FIG. 2 is a schematic view of the trimming and slitting unit for the insulating pipe.

The apparatus of FIG. 1 for producing the insulating pipes processes continuous elastic, laminatable foam sheets, for example, cross-linked polyethylene foam sheets having a width of 1–1.50 m with a thickness of 10–15 mm, into thick-walled insulating pipes having relatively large internal diameters. To produce a wall thickness of, for example, 10 cm, ten layers are required in case of a thickness of the length of foam material of 10 mm; in other words, ten plies of foam sheet must be laminated on top of each other to obtain the desired insulating pipe. The apparatus of this invention includes a machine frame 1 and an expandable mandrel 2 attached in an exchangeable manner at the machine frame on a unilaterally supported shaft. This expandable mandrel is equipped with an infinitely controllable drive, with an electric magnetic clutch, and with a pneumatically operating tensioning or expanding means. Furthermore, a pressure roller 3 is attached to the machine frame 1 via rocker arm 5; the pressure roller 3 is urged against the expandable mandrel 2 and/or moved away from the mandrel by a pneumatically operating actuator device, constructed as a telescopic unit 4, which unit engages the rocker arm 5 and is attached to the machine frame 1 on the other side. The burner 6, constructed, for example, as a water-cooled propane gas-air mixture burner, is arranged advantageously above the pressure roller 3; this burner is pneumatically pivotable, for example it is pivotable by 90°. Thus, the flame 7 of the burner 6 can be oriented directly onto the surface of the foam material and/or can be moved away therefrom. For cutting off the foam sheet after the insulating pipe has been produced, the resilient stop bar 8 is mounted to the machine frame 1 so that the foam sheet can be severed, for example by means of a knife, wielded by hand. The foam sheet for producing the insulating pipe is fed from the take-off stand 9 on which the roll of foam material 11 is supported and which is advantageously equipped with a brake. The mode of operation of the apparatus is as follows:

The roll 11 of foam material is hung into the take-off stand 9, and the sheet 10 of foam material is fed via the guide roller 12 provided at the machine frame 1 by way of the pressure roll 3 to the mandrel 2 and clamped in place at a clamping bar 25, on the expandable mandrel 2. Hereby the sheet material is looped over the pressure roller 3 and placed between the pressure roller and the periphery of the mandrel. The pneumatic tensioning device now expands the expandable mandrel to the internal dimension, i.e. the internal diameter of the insulating pipe to be manufactured. Thereafter the pressure roll 3 is pneumatically pressed against the initially applied layer of sheet material on the expanded mandrel 2 by means of the telescoping device 4. At this stage, the expanded mandrel is set into rotation, see direction of arrow 13; after a one-quarter up to three quarters revolution, the burner 6 is automatically ignited and pivoted into the operating position shown in FIG. 1. The expanded mandrel now revolves until the desired number of plies of foam sheet and thus the desired wall thickness of the insulating pipe has been wound up and the plies have been flame laminated to one another. The wall thickness of the insulating pipe is determined by the thickness of the foam sheet and the number of wound layers (dotted lines 26). Advantageously, the number of revolutions executed by the expanded mandrel and/or the number of wound laps is scanned and fed to a control device for the installation, for example, with the aid of a perforated light-stop disk. Depending on the initial programming of the number of plies, the burner 6 then is pivoted from the operating position into the rest position after the desired number of layers has been achieved, and the burner is simultaneously extinguished except for the pilot light. After another half revolution, the expanding mandrel is then stopped. The sheet 10 of foam material is cut along the abutment strip 8; at this stage, the expanded mandrel is relaxed, i.e. contracted, and the insulating pipe product is pulled off the expandable mandrel. This insulating pipe product is then finished with the device shown in FIG. 2.

The device of FIG. 2 represents the trimming and slitting apparatus for the insulating pipe prefabricated in the installation of FIG. 1. This device comprises a machine frame 14 on which a shaft 15 is supported on both ends. The shaft 15 is equipped with holding arms 16; in the illustrated embodiment there are four holding arms arranged at a mutual angle of 90°. Clamping jaws 17, 18 which open and close pneumatically are provided at the ends of these holding arms. The shaft 15 is moved in timed increments by 90° segments and thus has four operating positions I through IV. In operating position I, the insulating pipe product 19, in the initially formed condition wherein it leaves the laminating device, is clamped into the clamping jaws 17, 18. In operating position II, the band cutter 20 is provided for trimming the end faces of the insulating pipe 19; this cutter can be adjusted to the respective length dimensions and has an operating direction as indicated by arrow 21. In the operating position III, the insulating pipe 19 is slit in the longitudinal direction with the aid of the blade 24 fashioned as a circular knife. The slit 23 can be effected radially or also obliquely so that the seam zone is covered more satisfactorily, as desired; for this purpose, it is merely necessary for the blade 24 to assume a corresponding, oblique position. In operating position IV, the finished, trimmed and slit insulating pipe 19 is removed by opening the clamping jaws 17, 18. Thereafter, a new insulating pipe for finishing is clamped in place, in operating position I. The direction of rotation of the device according to FIG. 2 is indicated by the arrows 22.

Another aspect of this invention; namely the process for producing a synthetic multilayered insulating pipe, includes the steps of securing one end of a continuous insulating sheet of foam material comprised of a synthetic thermoplastic resin onto an expandable and rotatable mandrel, the mandrel having been set to provide the desired internal diameter of the pipe (prior to winding a full wrap of the insulating sheet thereon), then rotating the mandrel to wind the insulating sheet onto the mandrel and bonding each successive wrap of the sheet to the next wrap to form a multilayer laminated insulating pipe product. Thereafter, this initially formed product is trimmed at each end and is slit from one end to the other end, so that the pipe may be placed over a pipeline or the like.

It will be understood that after the initial lamination operation wherein the multilayered insulating pipe product is formed, this pipe product may be transported by hand or by an appropriate conveyor or like transporting means to the finishing unit wherein the initially formed pipe product is trimmed and is slit. Moreover, it will be appreciated that the various control means are provided to control the operation of each apparatus during lamination and finishing, e.g. regulating the amount of rotation of the mandrel prior to moving of the burner or other means for producing a bond between the layers to an operative position and effecting the movement of cutting means during the trimming and sliting operations.

What is claimed is:

1. A machine installation for the manufacture of a thick-walled insulating pipe of elastic, laminatable foamed synthetic resin sheet material, which comprises an apparatus for the lamination of the foamed synthetic resin sheet material during winding of the sheet material on a mandrel to form a multilayer insulating pipe having a length corresponding to the sheet width of the sheet of foam material, said apparatus comprising an expandable and rotatable mandrel equipped with a pneumatic tensioning means and an infinitely variable drive mechanism for rotating the mandrel to wrap the sheet material thereon, and a pressure roller which can be urged against the mandrel, this roller being movable pneumatically by means of a telescopic holder, the mandrel being associated with a pivotably mounted burner means for flame laminating the wraps of the sheet of foam material together to form a laminated sheet pipe product and a cutter for separating the pipe product from the non-laminated sheet material, and a means for finishing the initially formed pipe product comprising a shaft rotatable in timed segments with clamping jaws being capable of receiving an unfinished insulating pipe product and being opened and closed pneumatically, wherein one holding arm is associated with a band cutter for trimming the end faces of the insulating pipe product, and a further holding arm is associated with a blade for slitting the insulating pipe along its length.

2. The machine installation according to claim 1, wherein the expandable mandrel is attached to a machine frame so that this mandrel can be exchanged.

3. The machine installation according to claim 1, wherein the burner means comprises a water-cooled propane gas-air mixture burner that is provided adjacent to said mandrel for effecting the flame lamination of said sheet material.

4. The machine installation according to claim 3, wherein a regulating means is associated with the burner for igniting the burner in dependence on the revolution of the expanding mandrel during formation of the insulating pipe.

5. The machine installation according to claim 1, wherein a control means is provided for measuring revolutions of the expanding mandrel and/or for measuring the number of layers of foam sheet of the insulating pipe.

6. The machine installation according to claim 1, wherein four holding arms are arranged on the shaft at the mutual angle of 90°.

7. The machine installation according to claim 1, wherein the blade is fashioned as a revolving, high-speed circular knife.

8. The machine installation according to claim 1, wherein said burner means and said pressure roller are bonded on a pivotably movable arm, said burner means being positioned above the pressure roller for heating a portion of a wrap of the sheet material only after said portion has moved approximately through one rotation of said mandrel.

* * * * *